June 30, 1970   M. A. COLON-MORALES   3,517,636
DEVICE FOR MONITORING PHYSIOLOGICAL PHENOMENON
Filed June 25, 1969   3 Sheets-Sheet 1
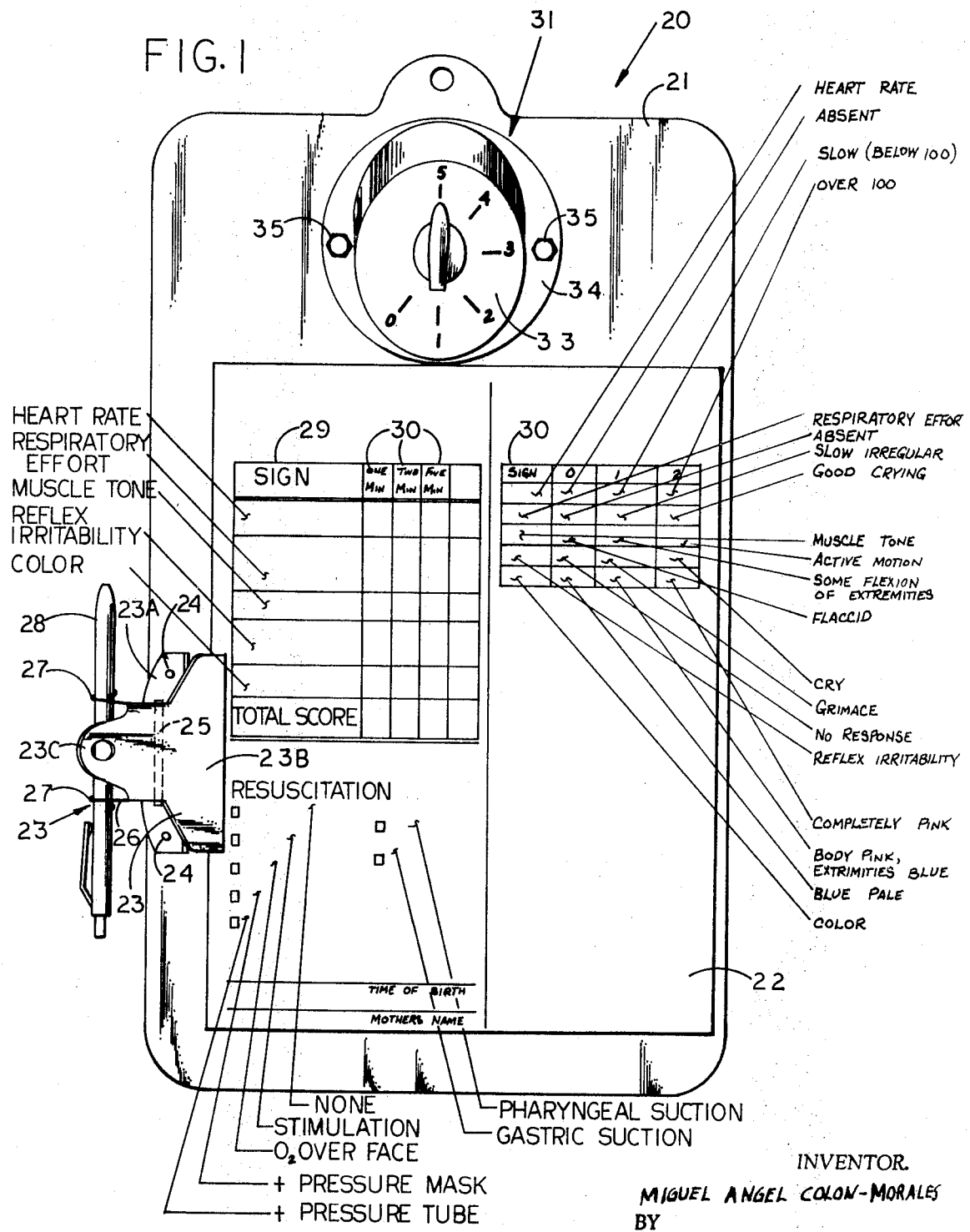

June 30, 1970  M. A. COLON-MORALES  3,517,636
DEVICE FOR MONITORING PHYSIOLOGICAL PHENOMENON
Filed June 25, 1969  3 Sheets-Sheet 2

INVENTOR.
MIGUEL ANGEL COLON-MORALES
BY
Arthur F. Faltebre
ATTORNEY

INVENTOR.
MIGUEL ANGEL COLON-MORALES
BY
ATTORNEY 3,517,636
DEVICE FOR MONITORING PHYSIOLOGICAL
PHENOMENON
Miguel Angel Colon-Morales, Rio Piedras, Puerto Rico
(G.P.O. Box 4547, San Juan, Puerto Rico 00936)
Filed June 25, 1969, Ser. No. 836,381
Int. Cl. G08b 3/00
U.S. Cl. 116—67                                    1 Claim

ABSTRACT OF THE DISCLOSURE

This disclosure is directed to an aid in monitoring certain physiological phenomenon, and more particularly the assertation of prompt and accurate diagnosis of newborn depression. The device comprises a clip board with means for detachably securing a tablet thereon which is provided with indicia thereon for quickly summarizing various physical signs which experience has shown have a direct relationship to the depression of a newly born baby and/or causes for the development of neuromuscular deficiencies in childhood. A timing unit is operatively associated on the clip board for precisely timing the intervals between the recording of the necessary observations, as the time of such observation is especially critical within the first few minutes of life.

PROBLEM IN THE ART

Heretofore in childbirth, the newly born infant frequently suffered from lack of attention by the attending physician or the midwife in more rural or primitive areas. This is because the attending doctor or person is more concerned with the mother, and therefore leaves the care and attention of the newly born infant to others, i.e. nurses, who are in attendance during such deliveries. Because of this lack of attention, it has been discovered that many infants are subjected to permanent disability for failure to promptly diagnose readily assertable irregularities occurring at birth or immediately thereafter.

Frequently mental deficiency or retardation of childhood can be directly traced to irregularities occurring at birth, which if promptly diagnosed at the time could have been prevented, corrected and/or eliminated.

Experience has shown that newborn depression due to acidosis and/or neuromuscular deficiencies etc. can be readily diagnosed by observing certain objective signs and/or physiological responses which can be easily determined. These signs include such observations as heart rate, respiratory effort, muscle tone, reflex irritability and color. However, these observations, to be of any value, have to be systematically made during the first few minutes of life. Because a suitable timing device was not always available, extreme difficulty has been encountered in the field with the proper timing of these necessary observations to prevent injury and/or death of the new born infant who may be a victim of some birth irregularities and/or anomaly. To be effective it has been discovered that the reading of the foregoing observation has to be made preferably during the first and fifth minutes of life.

OBJECT

It is therefore an object of this invention to provide an all inclusive device by which an attending physician can time and record his observations of the critical objective physical signs of a new born child and thereby make any prompt and accurate diagnosis of any newborn depression or causes of latter neuromuscular deficiencies which may result in permanent injury or death to the infant.

Another object is to provide a timing device for timing the observation of the noted objective signs which can be readily secured to any suitable supporting surface, and which is relatively simple and positive to operate.

Another object is to provide an all inclusive device which includes a writing tablet having prearranged indicia thereon for facilitating the scoring of the objective physical responses of a new born child which experience has shown can form an accurate basis upon which to predict survival and/or to rapidly diagnose any deficiency or abnormality of the infant.

BRIEF SUMMARY OF THE INVENTION

The foregoing objects and other features and advantages are attained by an article which comprises a relatively stiff backing member having means thereon for releasably securing a writing tablet. The pages of the tablet are each formed with prearranged indicia thereon and other information thereon for rapidly scoring and summarizing the results of observing certain objective physical responses and/or phenomenon, i.e., heart rate, respiratory effort, muscle tone, reflex irritability, color and various signs of resuscitation. Connected to the backing member so as to be all inclusive, is a timer means which is specifically constructed so as to sound an audio alarm at predetermined timed intervals. The timer means is constructed so that the audio alarm at the spaced time intervals is successively sounded upon a single setting of its indicating means. This invention further contemplates the construction of the timing means so that it can be independently utilized and arranged so that it can be rendered detachably secured to any suitable supporting surface.

FEATURES

A feature of this invention resides in the provision of an all inclusive device which will greatly facilitate the scoring and timing of certain physical responses and/or observations of a newly born infant for providing a prompt and accurate diagnosis of new born depression.

Another feature resides in the provision of a timer which is specifically constructed and arranged so as to automatically sound an audio alarm at predetermined spaced intervals of time upon a single setting thereof.

Another feature resides in the provision of a timer constructed and arranged so as to be rendered readily detachable from the backing member so as to be independently utilized.

Another feature of the invention resides in the provision of a writing tablet having prearranged indicia thereon for rapidly scoring and summarizing the results of the observed physical signs for arriving at a prompt and accurate diagnosis of any new born depression.

Other features and advantages will become more readily apparent when considered in view of the drawing and specification in which:

FIG. 1 is a plan view of the complete device for observing, timing and recording physiological signs of a new born infant.

SPECIFICATION

Figure 3:
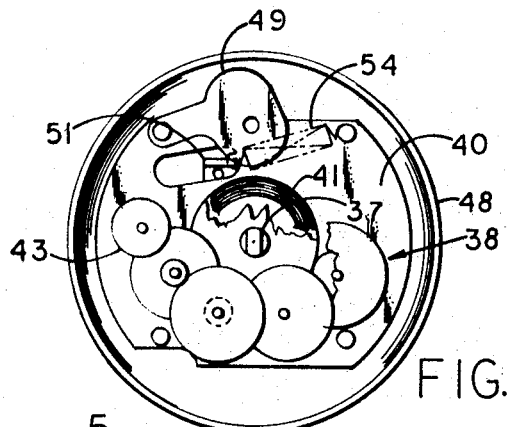
FIG. 3 is a front plan view of the internal assembly of the timer unit illustrated in its inoperative position.
Figure 4:
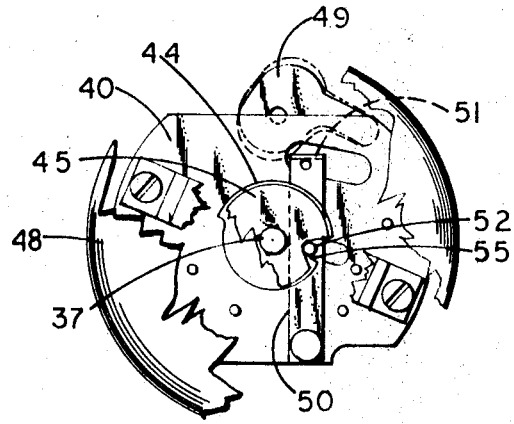
FIG. 4 is a rear plan view of the timer parts as shown in FIG. 3.

Referring to the drawing there is shown in FIG. 1 the complete device 20 for monitoring physiological phenomenon, and more particularly the means for making a prompt and accurate diagnosis of newborn depression in an infant during its first minutes of life. Experience has shown that various physical signs in a newly born infant can be conveniently summarized and which when scored against a predetermined statistical score can be utilized to accurately predict the survival and/or health status of the infant. In order that the system may prove consistent, and to gain the full advantage of proper treatment and prognosis, it is imperative that the observation be secured and recorded in their proper timed sequence. To facilitate the scoring and recording of the observations the device 20 comprises a rigid backing member 21 to define a suitable clip board on which a pad or tablet 22 may be releasably secured. The tablet 22 may consist of a single sheet or a pad of similar sheets which is secured to the board member 21 by means of a clip 23.

The clip 23 comprises essentially of a fixed jaw member 23A which is suitably secured to the board 21 as by fasteners 24. A movable jaw 23B is suitably hinged to the lower jaw about a hinge pin 25, and a spring 26 coiled about the hinge pin normally biases the jaws toward a closed position. As shown in FIG. 1 the movable jaw 23B is provided with an extension 23C to which pressure may be applied to pivot the movable jaw to effect release of the pad 22 from the board 21. It will be noted that the clip 23 is disposed along a longitudinal edge portion of the board.

In accordance with this invention the end portions of the coil spring 26 are provided with looped ends 27 adapted to snugly receive the barrel portion or body of a pen or pencil 28. With the arrangement described the presence of writing implement 28 is assured for making the necessary recordings on the pad or sheet 22.

Each sheet of pad 22 is provided with indicia 29 for tabulating and scoring the observed objective signs such as heart rate, respiratory effort, muscle tone, reflex irritability and color. Indices 30 are also provided on each sheet or page of the pad 22 for recording the observation at spaced intervals, e.g. during the first and fifth minute of life.

On each page there is also provided a statistical table 30 on which a predetermined score is applied to varying degrees of noted or observed physical signs herein described; and against which the noted observations may be made to provide for a prompt and reliable diagnosis of the new born's condition. The observable physical signs which can be easily determined without interfering with the care of the new born infant have been standardized, and as a result of the efforts of Dr. Virginia Apgar a scoring system was established based on these standardized signs to predict survival, to compare methods of resuscitation and through the infant's responsiveness after delivery to compare prenatal experiences.

For example, the predetermined statistical table 30 scores the varying degrees of the respective objective physical activities to be monitored as 0, 1 or 2. That is, a score of 0 is given if the heart rate is absent, a score of 1 if the heart rate is slow, and a score of 2 if the heart rate is over 100. The same scoring is carried over to signify the varying degrees of the other standardized objective signs, hereinbefore enumerated.

The attending physician in observing the various objective signs will then apply in indices 29 and 30 the applicable score to the observed degree of respective objective sign he notes in the new born infant. The observed scores are quickly recorded in the appropriate table 29 and 30 and compared with the statistically predetermined score.

From statistical studies it has been determined that a score from 7 to 10 is generally indicative of a vigorous or healthy baby, a score of 4 to 6 to a depressed infant, and a score of 0 to 3 to a markedly depressed infant.

However, in order that the scoring of the observed objective signs, which have been standardized, it is imperative that the observation and scoring thereof be made preferably during the first and fifth minutes of life. For this reason there is provided directly on the clip board 21 a timer 31.

The timer comprises a housing 32 having an inclined face portion 33 and a circumscribing base flange 34 which engages the board 21. The base flange 34 is provided with opposed apertures for receiving screw fasteners 34 by which it is detachably secured to the board 21.

As shown the face 33 of the timer is provided with indices to depict one minute intervals. In the illustrated embodiment a five minute timer is shown. An indicator arm 36 is secured to the main shaft 37 of the timer mechanism 38.

The timer 35 is constructed so as to sound an audio alarm preferably at the end of a one and five minute interval. Referring to FIGS. 2 to 8, the timer includes a pair of spaced apart frame members 39 and 40 for housing the clock mechanism 38. The main shaft 37 extends centrally of the respective frame members and a main coil drive spring 41 is operatively connected thereto. Operatively connected in driving relationship to the drive assembly is a timing gear train 42 of meshing gears controlled by a conventional clock-escapement assembly 43.

A two part cam including a lower cam disk 44 and an upper cam disk 45 is operatively connected to the shaft 37. The upper cam 45 is secured to the shaft to rotate therewith and the lower cam 44 is connected in driving relationship to the upper cam. The arrangement is such that the respective cams are coupled for limited relative movement. This is attained by a slot and pin connection 46, 46 between the two cam disks; i.e., a slot 46 is formed in the lower cam and a complementary pin 46A adapted to be received therein is connected to the upper cam 45.

Included as a component part of the timer is an audio alarm. The alarm comprises a bell housing 48 encircling one of the frame members. A bell striker or hammer 49 is pivotally connected between the frame member and arranged to strike the bell 48 when actuated.

The actuator for operating the hammer at predetermined time intervals comprises a lever arm 50 pivotally mounted on frame member 40. The free end 51 of arm 50 is bent at an angle to lever 50 so as to be disposed against the hammer. Intermediate the length of the arm there is connected thereto a cam follower pin 52 anchored at one end to the frame means 39, 40 and connected at its other end to the free end 51 of the actuator lever arm 50 is provided to bias the lever toward its normal inoperative position as seen in FIG. 3.

As best seen in FIGS. 4 to 8 the lower cam 44 is provided with arcuate cam edges 44A, 44B which are stepped and against which the cam follower pin 52 of lever 50 is biased under the tension of spring 54. The arrangement is such that as the cam follower rides over a stepped portion of the lower cam the actuator is caused to impart a sharp impact onto the hammer causing it to strike the belt 48 and sound the alarm at a predetermined time interval.

Figure 2:
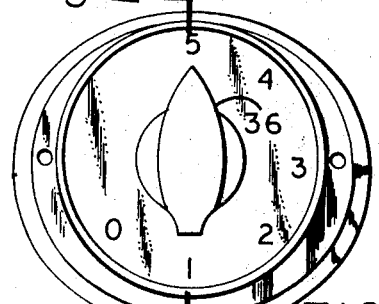
FIG. 2 is a front view of the timer face illustrating the same in its normal inoperative position.
Figure 5:
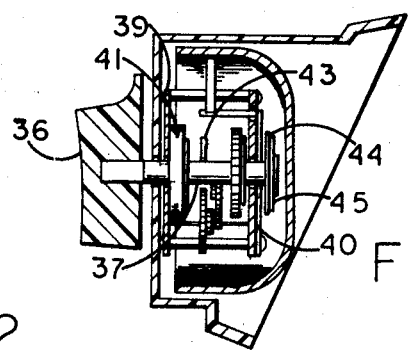
FIG. 5 is a sectional view taken along line 5—5 on FIG. 2.
Figure 7:
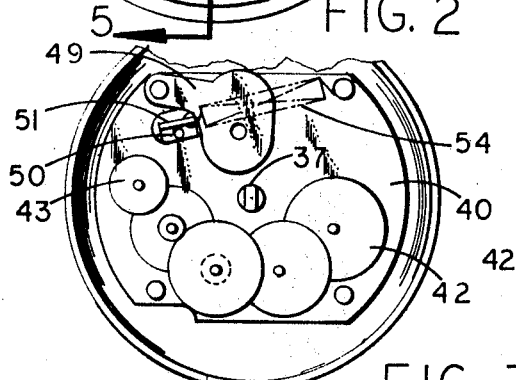
FIG. 7 is a front plan view of the timer's internal assembly in the operative position.
Figure 8:
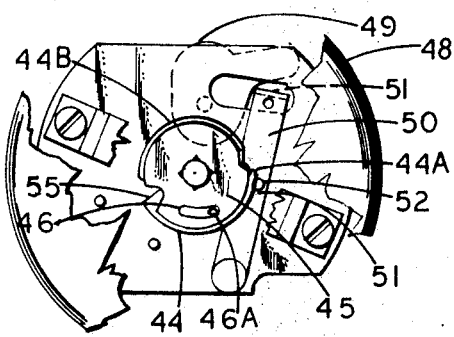
FIG. 8 is a rear plan view of the timer's internal assembly in the operative position.
Figure 6:
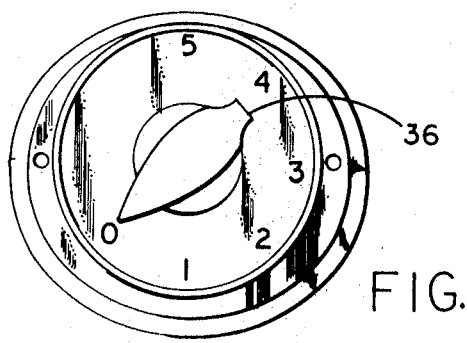
FIG. 6 is a front plan view of the timer similar to that of FIG. 2, but illustrating the time set for operation.

The arrangement is such that when the indicator arm or pointer 36 is rotated from the position of FIG. 2 to that of FIG. 6 to set the timer for run-down, the upper cam will lift the cam follower 52 out of the slot 55 of the lower cam to finally position the follower 52 under lobe 44A of cam 44 as seen in FIG. 8.

On run-down of the timing mechanism 38, the upper cam 45 is rotated relative to the lower cam 44 until the pin and slot connection therebetween causes the lower cam to be connected in driving relationship to the upper cam 45. Continued rotation of the coupled cams during run down causes the cam follower to ride off node 44A onto node 44B. In doing so, the spring 54, acting on the lever arm causes it to effect displacement of the hammer to strike the bell 48 to sound the alarm. The arrangement is such that the follower rides from node 44A to node 44B at the end of the first minute of run down.

Upon continued run-down of the time mechanism 38 the cam follower will ride node 44B of cam 44. At the end of the run down the cam follower falls into notch 55 to again effect displacement of the hammer to sound the alarm again.

Accordingly, the arrangement is such that with a single setting of the indicator the cooperating cams 44 and 45 and associated time mechanism will activate the alarm at the end of the one and five minute intervals.

In operation, the indicator 36 is set by timing the indicator to 0, as viewed in FIG. 6, the instant of birth of an infant. Upon release the timer mechanism will run down and a bell signal sounds at the end of the "one" minute interval, and again at the "five" minute interval. At the sound of the bell, the physical signs are observed by the attending physician and should be recorded and judged in the appropriate chart on pad 22. By quickly adding the scores of the respective observed signs and comparing the total with the predetermined Apgar score hereinbefore referred to, a prompt and accurate diagnosis and prognosis of the baby's health or status can be determined. Consequently new born depression can be quickly recognized and corrective measures be immediately taken to correct the cause of the observed depression. Because the device herein described enables depression to be quickly recognized, the necessary corrections can be quickly made before permanent injury or death occurs.

Figure 9:
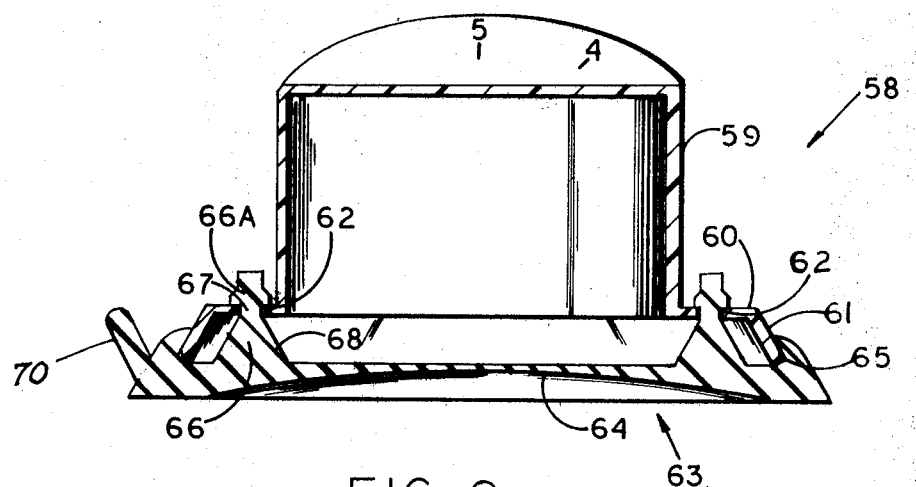
FIG. 9 is a front elevation view of a modified timer construction illustrated partly in section.

FIG. 9 illustrates a modified timer construction. In this embodiment the timer 58 is constructed so as to be usable independently of the clip board. In the illustrated form, the timer comprises a housing 59 having a circumscribing base flange 60 which terminates in a depending lip or skirt 61. Formed in the flange 60 are a plurality of spaced openings 62.

A means 63 is provided for detachably mounting the timer 58 to any suitable supporting surface. The mounting means 63 comprises a vacuum or suction cup 64 having a concave suction cup portion in which a circumscribing groove 65 is formed on the back sides thereof. The arrangement is such that the lips 62 are frictionally received within the groove 65.

Resilient pin means 66 are integrally formed with the suction cup means to secure the housing in place. Each pin means 66 is circumferentially spaced so as to be received within openings 62. As shown the pin means are formed with an enlarged resilient head end portion 66A which is adapted to be squeezed through openings 62. An intermediate portion of the pin 66 is provided with a reduced portion 67 sized slightly smaller than the diameter of opening 62. The base portion 68 of the pin is enlarged so that the base flange 60 of the housing can be snugly fitted to the suction cup pad 63. If desired a lift tab 70 may be provided to facilitate breaking the vacuum to effect removal of the timer from a supporting surface. In all other respects the timer is constructed as hereinbefore described.

The timer construction of FIG. 9 is thus rendered applicable for use with a clip board and pad of the type described herein, or it may be independently used.

Figure 10:
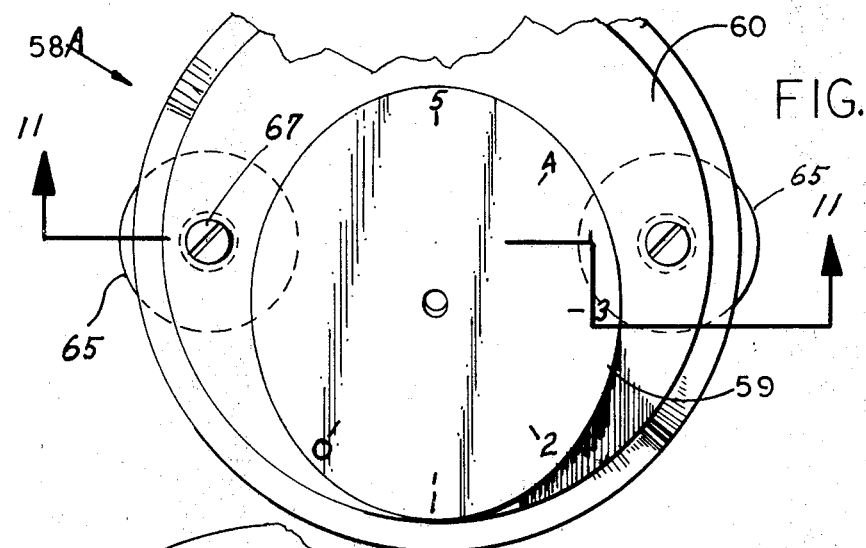
FIG. 10 is a plan view of another modified construction.
Figure 11:
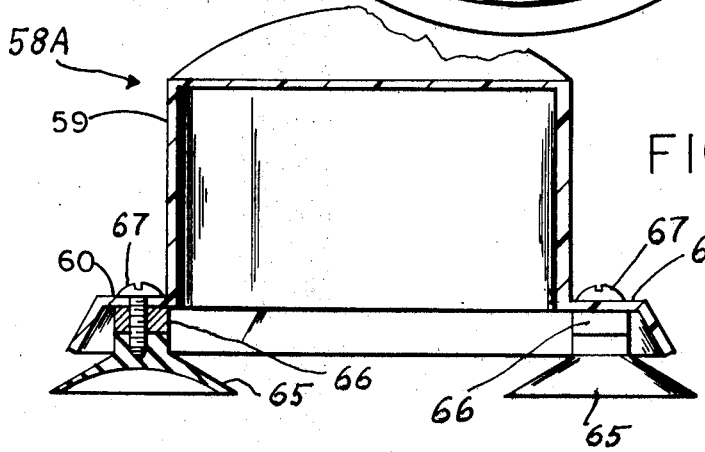
FIG. 11 is a sectional view of the modification of FIG. 10 taken along line 11—11 on FIG. 10.

FIGS. 10 and 11 illustrate a further embodiment of the invention. In this form the timer 58A is constructed similarly to that hereinbefore described, with respect to FIG. 9 except that the suction cup arrangement 65 is modified. In this form of the invention a pair of smaller suction cups 65—65 are secured to the base flange 60 of the timer housing 59. Referring to FIG. 11, a spacer 66 is disposed between the top of the respective suction cups and the bottom surface of the flange 60 so that the circumference of the respective suction cups can be maintained in a horizontal position. A suitable screw fastener or the like 67 secures the respective suction cups to the flange 60. In all other respects, the construction and operation of the timer 58 is similar to that hereinbefore described with respect to FIG. 9.

From the foregoing, the device so described comprises a complete means for recording physical phenomenon at predetermined time intervals. The device is particularly applicable at child birth. The device enables an attending physician to quickly and accurately diagnose newborn depression in time to take whatever corrective measures may be necessary before permanent injury or death can occur.

While the invention has been described with respect to various embodiments thereof, it will be readily understood and appreciated that variations and modifications may be made without departing from the spirit or scope of the invention.

What is claimed is:
1. An article of manufacture for monitoring physiological phenomenon comprising
   a rigid metallic flat board type member adapted to be readily carried,
   a clip connected along a vertical marginal edge of said board adapted to releasably secure a pad,
   said clip including a
   fixed jaw member secured to said board,
   and a movable jaw member pivotally connected to said fixed jaw member,
   and a spring means for biasing said jaw member closed,
   said spring means having curled outer end portions adapted to form a holder for a writing implement,
   a timer mounted on said member,
   said timer including a housing having a face portion,
   indices on said face portion for indicating an interval of time,
   a frame comprising a pair of spaced apart frame members disposed within said housing,
   a timing mechanism disposed between said frame members,
   said timing mechanism comprising a main drive assembly including a main shaft rotatably journalled between said frame member and extending beyond said frame member,
   a main spring for driving said shaft,
   a driving gear mounted on said shaft to rotate therewith,
   a timing gear train connected in driving relationship to said drive assembly,
   said gear train including a plurality of gear assemblies serially connected in driving relationship,
   an escapement assembly operatively connected to said gear train to control the timed operation thereof,
   an audio alarm including a bell member adapted to encase said timing mechanism,
   a hammer pivotally mounted between said frame members adapted to strike said bell when actuated,
   means for activating said hammer on at least two spaced apart, predetermined time intervals,
   said means including a camming means operatively connected to said shaft,
   actuator means pivotally mounted on said frame,
   a cam follower carried on said actuator means disposed in camming relationship with said camming means,
   spring means for biasing said cam follower in camming relationship to said cam means,
   said camming means including a cam drive member connected to said shaft to rotate therewith,
   a driving cam member mounted on said shaft for relative rotation with respect thereto, means for coupling said cam drive member to said driven cam member,
said coupling means including a slot formed in said driven cam member,
and a pin fixed to said cam drive member adapted to be received in said slot whereby said cam member is driven as said shaft is rotated,
said cam member having space nodes for effecting displacement of said actuating means to activate said hammer to sound said audio alarm,
said nodes being circumferentially spaced at predetermined intervals to define a 1 and 5 minute time interval,
recording means adapted to be retained on said board by said clip,
indicia means on said recording means for scoring the observed phenomenon at each of said time intervals,
and said recording means including a predetermined statistical data means thereon.

References Cited

UNITED STATES PATENTS

| | | | |
|---|---|---|---|
| 2,543,032 | 2/1951 | Laviana | 58—127 |
| 2,803,300 | 8/1957 | Warkentien | 58—39.5 |
| 2,881,009 | 4/1959 | Delaney | 281—44 |

LOUIS J. CAPOZI, Primary Examiner

U.S. Cl. X.R.

58—39.5; 116—114; 281—44